Nov. 8, 1966 — A. A. WEISMANN ETAL — 3,283,611

POSITIVE DRIVE DIFFERENTIAL

Filed Jan. 29, 1964

Inventors:
Albert A. Weismann
Peter H. Weismann
By: Hofgren, Wegner, Allen,
Stellman & McCord
Attorneys

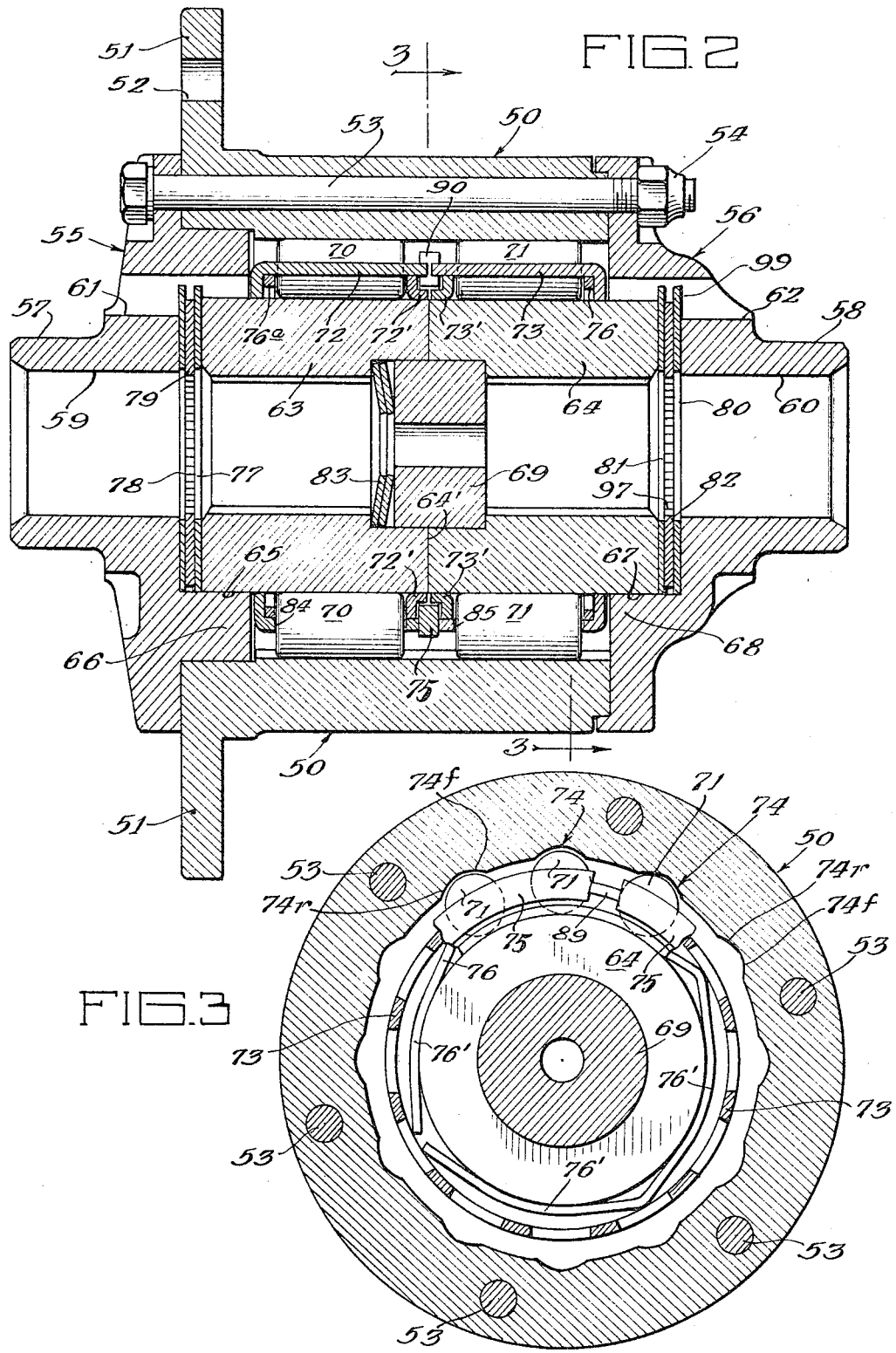

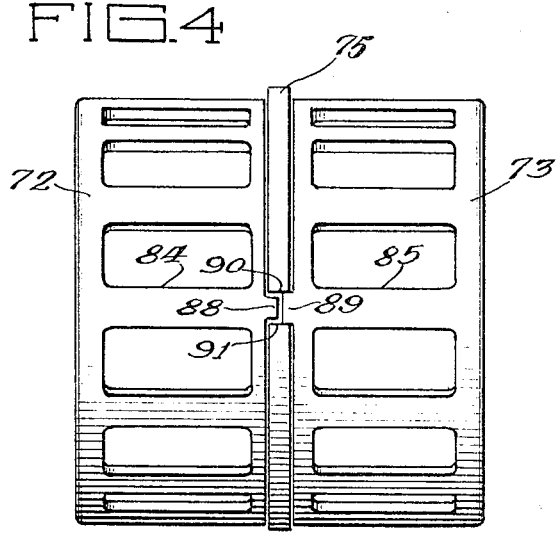
FIG.4
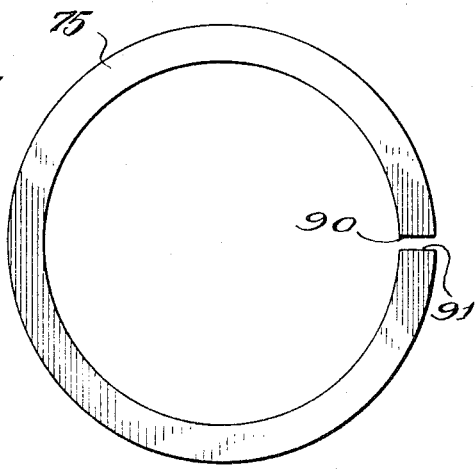
FIG.5
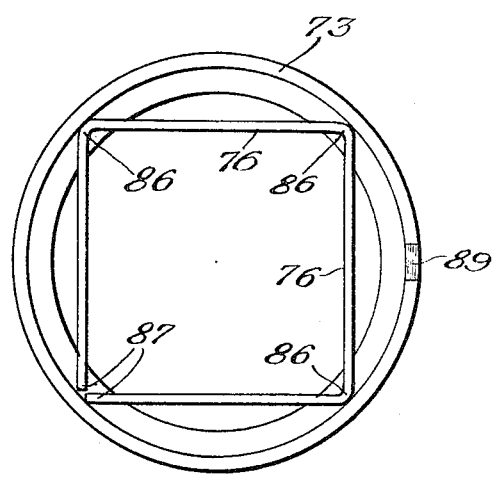
FIG.6
FIG.7
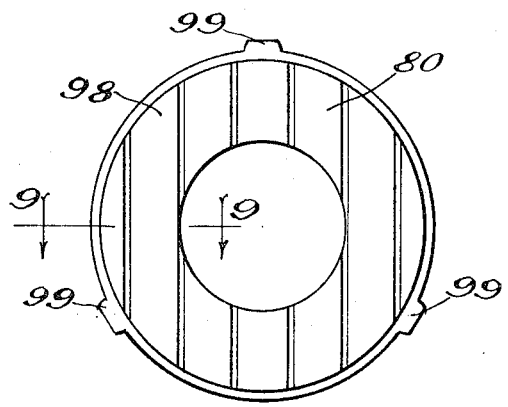
FIG.8
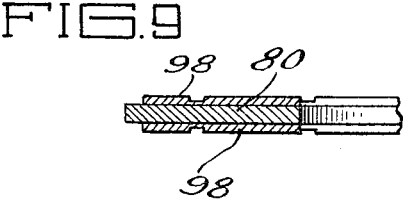
FIG.9

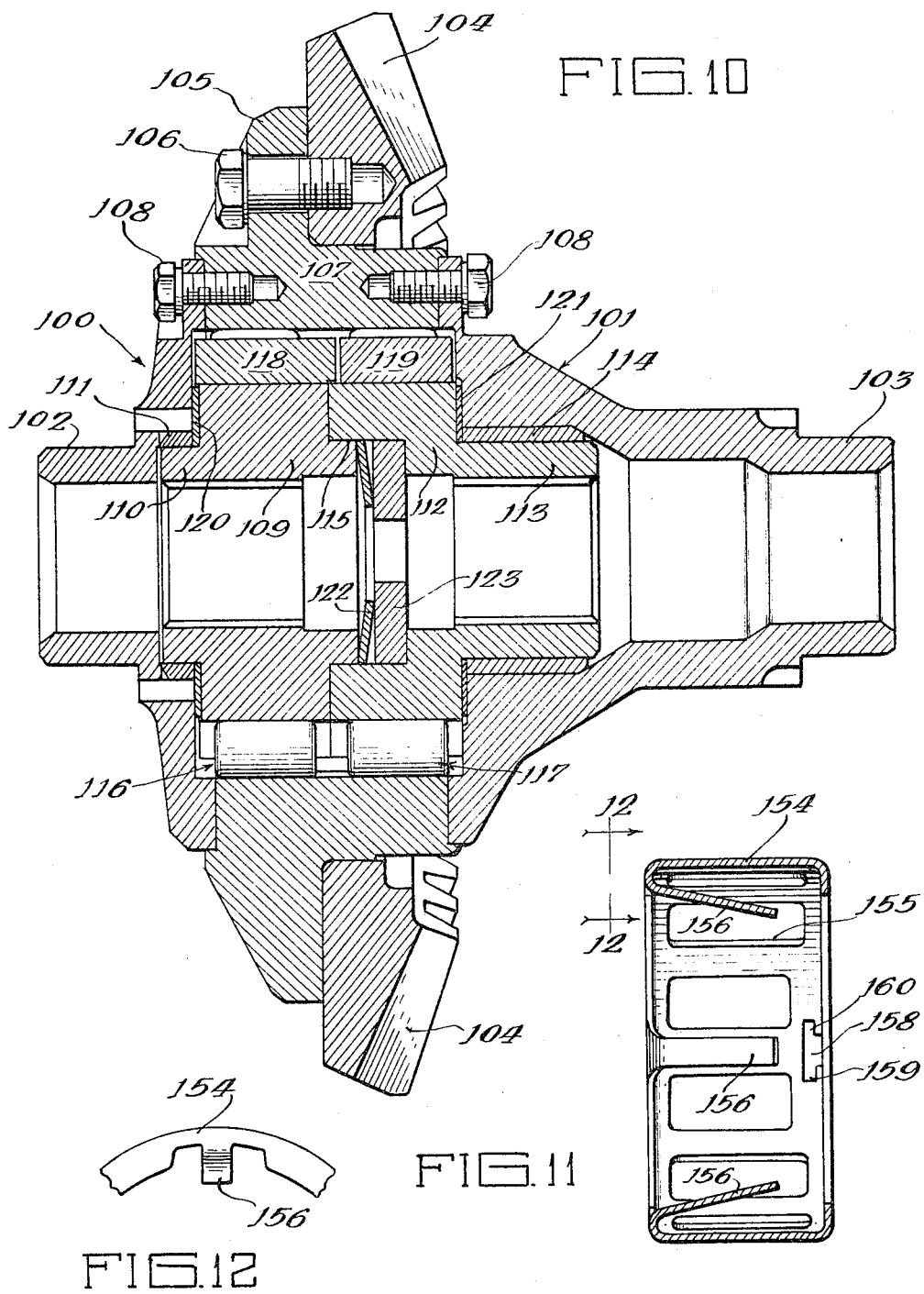

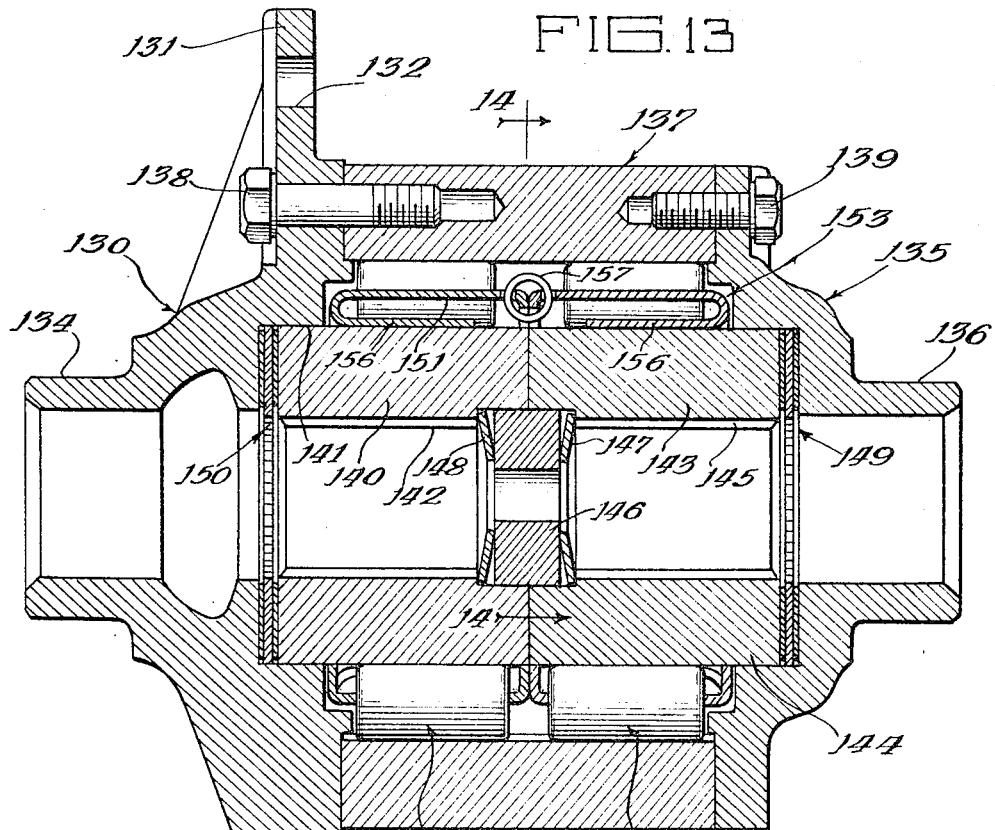
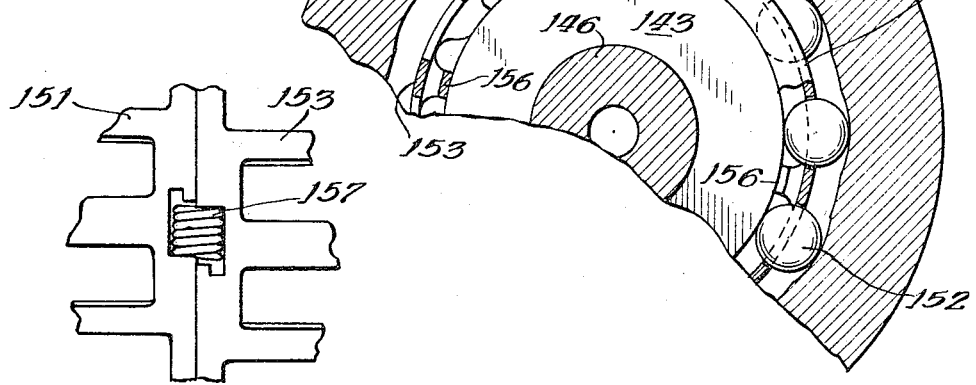

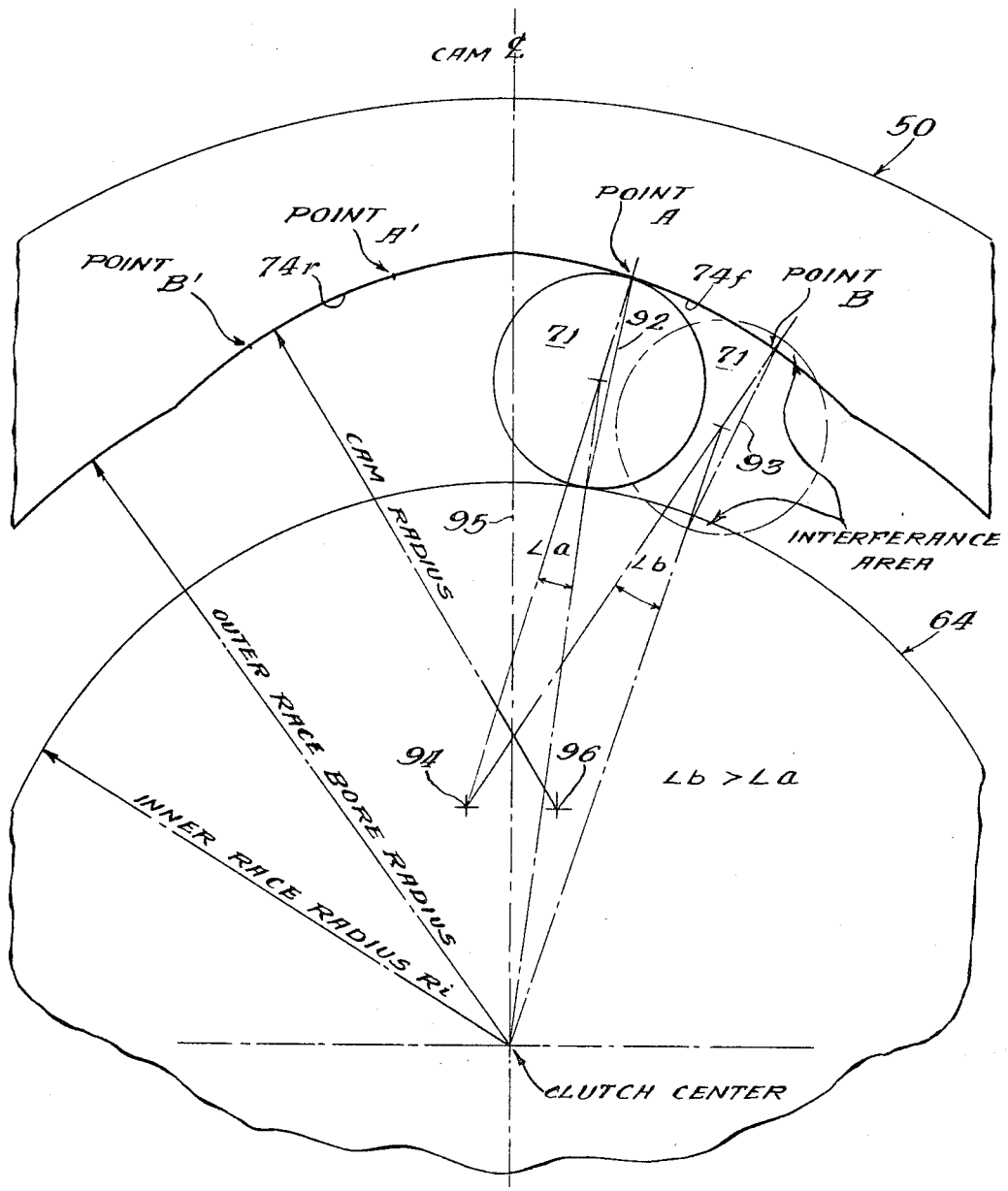

United States Patent Office 3,283,611
Patented Nov. 8, 1966

3,283,611
POSITIVE DRIVE DIFFERENTIAL
Albert A. Weismann, 1054 Rose St., and Peter H. Weismann, 769 Lee St., both of Des Plaines, Ill.
Filed Jan. 29, 1964, Ser. No. 340,992
19 Claims. (Cl. 74—650)

This invention relates to a positive drive differential and more particularly to a differential of a type useable in an automative vehicle drive train, but differing from the gear types used in most mass-produced automobiles in that one wheel is not permitted under any circumstances to spin relative to the other in the manner of gear type differentials.

The differential of this invention is a practical, "no-slip" differential acceptable to the auto industry. It is a gearless unit in that the axle to each wheel is driven positively in a rearward or forward direction through the locking of wedging members (rollers) between a driving member and a driven member.

It is the principal object of this invention to provide a new and improved differential drive between a driving member and a pair of coaxial driven members.

It is a specific object to provide a new and improved differential interchangeably acceptable into the drive trains of present day automotive vehicles in place of the usual differential units made in large quantity.

Another object is to provide a new differential acceptable to the present automotive industry on the grounds that the unit will give reliably long life under adverse conditions, be quiet in operation without drive line clunking or chatter, be compact yet capable of transmitting large torque capacities available in present day high performance engines and be relatively low in cost through design simplicity and the maintenance of reasonable tolerances by unique designs.

A further object is to provide a gearless differential unit having unique design characteristics and which is compatible with existing axle housings, bearing locations, and assembly techniques by being interchangeable with existing gear type differentials.

Another object is to provide a gearless differential having roller bearings between the input and output members with controls over the locking of the rollers between the driving and driven members such that (a) there is achieved a smooth and noiseless transition between forward and reverse directions, (b) there is an automatic releasing of the driving connection to the extent and only to the extent necessary to permit one driven member to turn ahead of the other such as when a vehicle is negotiating a turn, (c) there is automatically provided a positive engagement between the driving and driven members when the unit is cold or hot or when subject to a gradually increasing torque or a suddenly applied large torque, (d) the rollers cannot engage themselves between the driving and driven members, but once engaged remain engaged and are self-energizing; a force must be supplied to make the rollers engage, and (e) there are means to prevent noise and jerking sometimes identified as clutch "chatter" by damping the movements of certain parts under certain conditions.

Other objects, features and advantages of the present invention will be readily apparent from the following description of embodiments illustrated in the accompanying drawings, in which:

FIGURE 2 is a longitudinal cross sectional view through a first form of the differential with the ring gear removed;

FIGURE 3 is a sectional view through the unit taken substantially along line 3—3 in FIGURE 2;

FIGURES 4 to 9 are details of parts of the unit shown in FIGURES 2 and 3;

FIGURE 4 is an elevational view of the cages and centering spring removed from assembly with other parts;

FIGURE 5 is a plan view of the cage centering spring shown in FIGURE 4;

FIGURE 6 is an end view of the cage of FIGURE 4 with the unsprung wire spring associated therewith and forming a part of the mechanism supplying cage drag;

FIGURE 7 is a plan view of a disc forming a part of the damping means;

FIGURE 8 is a plan view of a friction disc used with the disc of FIGURE 7;

FIGURE 9 is a fragmentary enlarged sectional view through the friction disc taken along line 9—9 in FIGURE 8;

FIGURE 10 is a sectional view through the center of a second form of the differential showing a different size of differential and some alternate construction of cages, bearings, driving and driven members and damping means;

FIGURE 11 is a central sectional view through the cage structure utilized in the alternate construction of FIGURE 13;

FIGURE 12 is a fragmentary elevational view of a portion of the FIGURE 11 cage taken substantially along line 12—12 in FIGURE 11;

FIGURE 13 is a sectional view through the center of a third form of the differential;

FIGURE 14 is a fragmentary sectional view through the differential taken substantially along line 14—14 in FIGURE 13;

FIGURE 15 is a fragmentary plan view of the cages and centering means shown in FIGURES 13 and 14; and FIGURE 16 is an enlarged diagrammatic illustration of a portion of one roller and the associated driving and driven members showing the relationship of the parts in various positions of operation for the purposes of illustrating operational and constructional features of the present invention.

Figure 1:
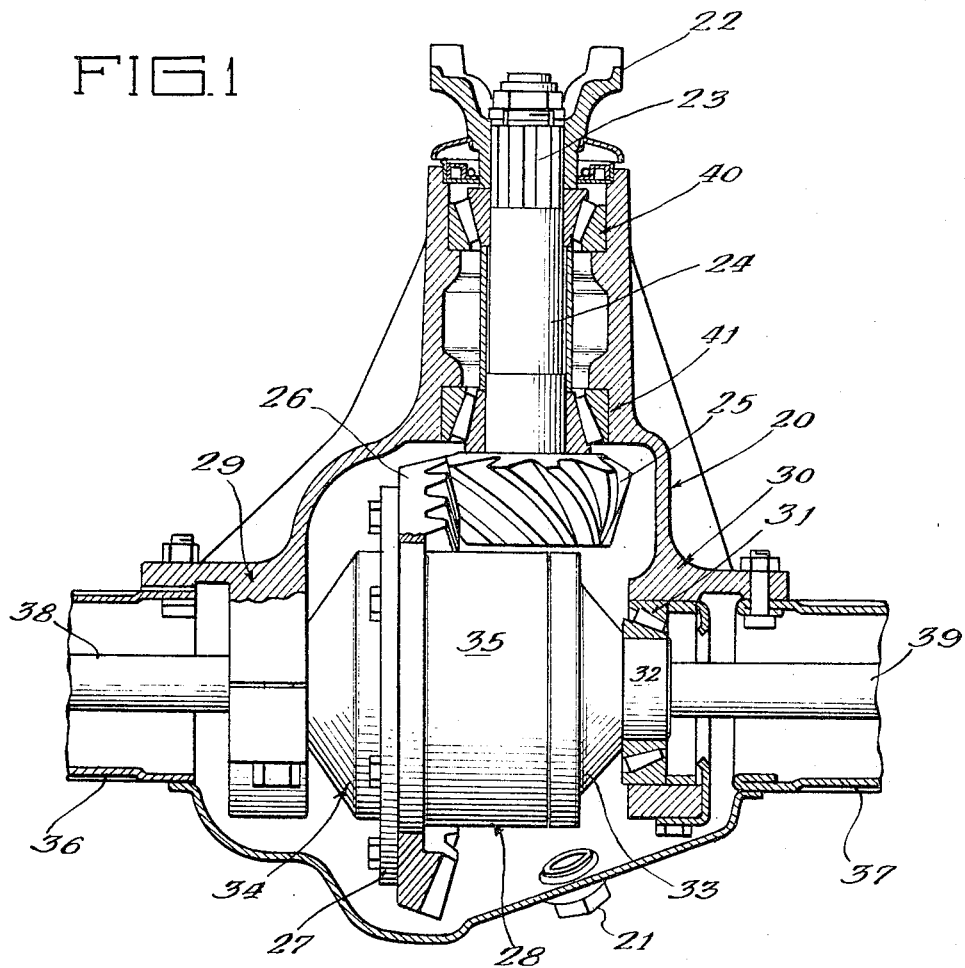
FIGURE 1 is a plan view partially in section, partially broken away and partially in elevation for the purpose of illustrating the present unit in one standard American automotive axle housing and particularly showing the manner in which the new differential is associated with the bearings and shafts about the housing.

Reference may be had to FIGURE 1 for the purpose of illustrating the position of the present differential in the drive train of an American passenger automobile. The illustration of FIGURE 1 shows a differential housing 20 having a plug 21 in an opening through which the differential is serviced and filled with lubricant. The drive train from the engine is connected to one-half of a universal 22 shown as on a spline 23 at one end of the short drive shaft 24 having a pinion gear 25 at its inner end. The pinion is in mesh with a ring gear 26 secured to a flange 27 on the differential unit indicated generally by reference 28.

The differential housing 20 is ordinarily a cast metal housing with appropriate parts by which the access to the interior may occur for repairs and for initial assembly. The housing is provided with portions such as the integral cast portion 29 on the left and the portion 30 on the right which support bearings for the differential 28. On the right-hand side, tapered roller bearing assembly 31 is illustrated as being in a supporting relationship to a bearing surface 32 on the end cap 33 on the right-hand side of the differential 28. On the left-hand side, the bearing portion 29 contains a similar tapered roller bearing supporting the bearing surface on the end cap 34 of the differential. In between the end caps there is a circular cylindrical portion 35 which forms the driving member of the differential involved in the present invention.

On either side of the differential housing there is shown an axle housing such as 36 on the left and 37 on the right, appropriately secured to the differential housing 20. The axle itself is a shaft such as 38 on the left and 39 on the right, each of which passes through the end caps on the differential to make a driving connection with the driven members within the differential. The support of the axles is by the driven member within the differential and a further support at the outboard end of the axles adjacent the automobile wheels.

The input drive shaft 24 is, of course, provide with appropriate bearing assemblies such as 40 and 41 in the usual fashion. The illustration of FIGURE 1 shows the relationship of all parts of the differential. The housing, the axles, their housing, the input shaft, and the bearings are those of a typical American car. The ring gear 26 and the pinion 25 which drives it are also typical members of a differential. In the illustration of FIGURE 1, it is the differential 28 which is different from usual construction.

In the drawings of the invention following FIGURE 1 there are shown three specific differentials embodying the details of the present invention. These differentials each operate upon the same principles. The variations are in size and shape of parts which go to make up the differential so that it may be adapted for use in various drive axles and may be placed therein in place of the usual gear type differentials.

The operating parts of the differential of this invention may be ascertained by examination of FIGURES 2 and 3 showing one such differential. The outer cylindrical and circular member 50 is the drive member or driving member formed of high tensile strength steel and having an upwardly extending flange 51 equipped with bolt openings 52 for the reception of the ring gear. The drive member 50 is bolted as by machine bolts 53 equipped with lock nuts 54 to the left-hand end cap 55 and the right-hand end cap 56. The end caps are respectively provided with bearing surfaces such as 57 and 58 for reception in the bearings provided within the differential housing. Each of the end caps is provided with an opening extending axially therethrough such as the openings 59 and 60 so that the axle may pass freely through the end caps into the interior of the differential. Openings are also provided such as the passage 61 and passage 62 so that lubricant within the housing for the differential may find its way into the interior of the differential itself.

Within the envelope formed by the end caps and the driving member 50 is a pair of side-by-side driven members 63 and 64, each of which has a smooth circular cylindrical outer surface and an inner surface splined to receive the mating end of the axle shaft. The driven members have a bearing support in the end caps and are closely confined endwise. The left-hand driven member has a portion 65 of its outer surface in a bearing relation with the inward extension 66 on the left-hand end cap. Similarly, a portion 67 of the right-hand driven member is in a bearing relation with a portion 68 of the right-hand end cap. During free wheeling, these bearings partially support vehicle loads on the axle and prevent engagement of the wedging elements in a reverse direction. If reverse engagement were permitted, a locked axle would result. A central bearing 69 is provided on the interior of the driven members for the purpose of maintaining them concentric with each other at their central inner faces 64'. To prevent driven member skewing caused by loads applied from the axles and thus prevent unwanted roller engagement, the driven members are confined between the end caps with substantially zero clearance.

The driving connection between the driving member 50 and each of the driven members 63, 64 is brought about by a set of wedging members in the form of roller bearings. The left-hand set of roller bearings is in this instance made up of twelve roller bearings 70 and the right-hand set by twelve roller bearings 71. The roller bearings in each set are maintained in a proper spaced relationship about the exterior of the inner driven member 63 by a cage structure 72 and similarly the right-hand set of bearings is mounted within a cage 73. The inner part of the cages are supported respectively on cage support rings 72' and 73'. The outer driving member is provided with two cam surfaces 74 (FIGURE 3) opposite each roller bearing 71 so that relative motion between the driven member 64 and the driving member 50 can lock the two members together by the interaction of the roller bearings against the cam surfaces. The forward cam surfaces 74f are clockwise of the reverse cam surfaces 74r (FIGURE 3). Sometimes the driven member is spoken of as a cylindrical race and the driving member as the cam race, cooperating with the wedging members. While in the present instance the driving member is on the outside and the driven member on the inside, quite obviously, the parts could be reversed in position. For use in automotive drive trains, particularly when placing them in the housings available currently, it is preferred to make the unit with the driven members on the inside to receive the axles directly.

The two cages 72 and 73 control the position of the rollers in a set quite accurately since the cages fit about the rollers quite closely. The cages are separate from each other but are provided with a limited amount of lost motion relative to each other in a circumferential direction. A C-shaped spring 75 is maintained concentric between the cages by cage support rings 72' and 73'. The C-spring operates on both cages for the purpose of centering one cage relative to the other, yet permitting relative circumferential movement between the cages sufficient to permit free wheeling of one axle relative to the other. Additionally, each cage is resiliently secured to the inner race in such a fashion that the cage has a tendency to rotate with the inner driven member. In the illustration of FIGURES 2 and 3, the fastening of the cage to the driven member is by a wire spring 76a for the cage 72 and a similar wire spring 76 for the cage 73. The particular design aspects of these parts will appear below.

It is also desirable to dampen the movement of the driven member relative to the drive member under certain conditions of automobile movement. For this purpose, damping means is provided in the form of a friction disc 77 engaging the end of the driven member 63, a steel disc 79 next to the friction disc 77 and another friction disc 78 engaging the end cap 55. The steel disc 79 is equipped with a spline for engaging the left-hand axle. A similar arrangement of friction discs 80 and 81 on the right-hand side also clamped against the driven member 64 and end cap 56 and an intermediate steel disc 82 splined on the right-hand axle may also be employed. The pressure on the friction discs providing the damping may be by means of spring washers such as 83 urging the driven members apart by engaging the left-hand driven member 63 and the central bearing 69 between the driven members.

The importance of cage drag

The differential unit must work consistently whether the vehicle is parked, just starting to move, operating at high speed, cold or hot, when driven on a rough road with sudden or gradual changes in the throttle position on the engine in the vehicle in which the differential is located, or any and all combinations of these conditions. The conditions just enumerated usually may require a change in the differential locking between the driven and driving members. When driving at high speed, the wedging elements will be locked between the driven member and the driving members to propel the axles in a forward direction. The moment the driver lets up on the accelerator so that the engine of the vehicle is slowing the vehicle through the drive train, the wedging members must change to lock the driving member to the driven member in the opposite direction so that their functions become interchanged in effect.

The rollers between the driving and driven members have a position in which they do not engage or lock between the two members. Such a position may extend circumferentially of the members to some extent and be called a neutral zone. The rollers have a point of initial engagement and due to the large torques involved, the rollers can actually move further between the members in a loading zone of movement, being always in engagement while in the zone. One might refer to this condition as an initial engagement and a more severe engagement between the parts when the outer driving member being steel actually expands to a slight amount, the inner driven members also being steel would contract a slight amount, allowing the rollers to penetrate deeper in engagement than the initial engagement position. When the roller bearings are in the neutral zone where no engagement occurs whatsoever, it is important that means be provided to cause the rollers to make initial engagement immediately. Preferably, the neutral zone should be small in circumferential extent.

Once clutch engagement has occurred, it must be positive so that there is no skidding between the rollers and the driving and driven members. The means by which the rollers are caused to engage either in a forward or a reverse direction is associated with the cage such as the cages 72 and 73 previously mentioned. Referring to FIGURE 4, each of the cages is provided with a plurality of openings 84 on the left-hand cage 72 and 85 on the right-hand cage 73. These openings are formed in a steel member forming the cage such that they closely confine the roller bearings. Roller bearings are made to quite close tolerances and there is very little clearance between the roller and the opening in the cage in which it is placed. The position of the cage therefore controls the position of the rollers in a set. The control of the rollers by the cages prevents skewing of rollers under heavy load, insures that all rollers of a set engage simultaneously and with wear, clutch loading becomes uniform.

The specific means used to bring about engagement of the rollers between the driven and driving members is a drag of the cage with the driven member. This drag is provided (FIGURES 2 and 3) by a friction device in the form of a low spring rate wire spring interposed between the cage and its respective driven member. In FIGURES 3 and 6, the spring wire 76 is shown with its corner portions 86 in engagement with the cage 73. Likewise the ends 87 are in engagement with the cage. The wire springs are separate members or may be secured to the cages. Between the corners and ends of the wire spring, there are straight sections which in the assembly of FIGURE 3 are caused to flex or bend so that the intermediate section such as 76′ of the wire spring is frictionally in engagement with a substantial portion of the surface of the inner driven race 64. These low-rate springs cause the cage 73 to follow or tend to follow the inner driven member.

As an example of the operation of the cage, assume the vehicle standing still and the drive train set to propel the vehicle forwardly. The ring gear would be driven in a forward direction as would the driving member 50. The cams in the driving members would engage the rollers and tend to propel them at one extreme of the neutral zone. The cage controlling the position of the set of rollers tends to remain stationary with the driven member because of the resilient drag of the wire spring 76a engaging both the cage and the driven member. The cams of the driving member come into contact with the rollers and tend to push them ahead. The cage drag resists this force causing the rollers to make a positive contact simultaneously between the cams, the rollers and the inner races, thus fulfilling the requirements for full engagement. With further application of torque, the clutches lock and the outer race, clutches and inner races turn as a unit, imparting forward motion to the vehicle. The cage drag, the resistance of the cage against movement except with the inner member, must be great enough to cause a positive contact between the wedging members even though the unit may be cold and submerged in cold, heavy lubricant.

To move the vehicle in the reverse direction, the same type of process occurs except that the reverse cams on the driving member are used. The cage drag is in this sense omni-directionally sensitive and functions identically and equally well in either forward or reverse directions.

It is also important that the clutch engagement be operative while the vehicle is in motion. So long as the motor is driving the car in a forward direction, wedging members remain engaged between the driving and driven members on one of the cams, those for forward motion. The moment, however, that the throttle setting is decreased so that the engine compression tends to slow the car, the wedging members must come out of engagement with the forward cams and go into engagement in the reverse cams for allowing the momentum of the vehicle to in effect drive the engine. There is another instance in which the almost instantaneous engagement of the rollers in the opposite direction is required. This may occur when the wheels of the vehicle engage a chuck hole so that the wheel is out of contact with the road for an instant. Under these circumstances, free wheeling cannot be tolerated in that the re-engagement of the rollers between the driving and driven members may result in severe shock loading, causing destruction of the differential and impairing its long life.

The reliability of the frictional devices providing the cage drag is particularly good in the case of the wire springs. In the event of a breaking of one length of the wire spring, the other three remain operational. In the event of splitting of the sleeve constituting the cage, the springs still remain operational. The mere fact of assembly of the cage about the inner race and the insertion of the spring is all that is necessary to make the spring and the drag provided by its operational. The spring rate of the wire spring is quite low and thus can compensate for wear and misalignment expected during the life of the unit.

While the wire spring shown has four legs bent and sprung between the cage and the driven member, a different configuration of the spring may be utilized to obtain the advantages herein mentioned. The lubrication of the present spring is quite easy and occurs automatically because of the wedge formed between the spring and the inner driven member having the tendency to carry lubrication into the engaging surfaces. Because of the improved lubrication and the low rate of this type of spring, static and dynamic drag becomes more nearly equal. Under normal circumstances, the static coefficient of friction would be much higher than the dynamic coefficient of friction with the materials utilized. With the improved lubrication, the cage drag brought about by the use of the springs is thus more nearly equal under static or moving conditions. The present construction and means for providing the drag of the cage with the driven member also makes it quite simple to provide a sufficient amount of frictional yet yieldable drag of the set of rollers with the driven member to overcome any tendency of centrifugal force to maintain the rollers in the neutral zone between the driving and driven members. The cage drag in all instances must be sufficient to carry the rollers through the neutral zone into engagement in the forward or reverse direction against the tendency and force of centrifugal motion of the differential even at high speeds to maintain the rollers in the neutral zone and out of engagement.

*Relative circumferential movement between the cages*

The two cages 72 and 73 control independently their individual set of rollers. There is a condition under which the two sets of rollers must be permitted to circumferentially be out of alignment one with the other. The outer driving member is provided with the cam surfaces 74 extending longitudinally of the rollers and of the axles so that the cam 74 is a common cam to both sets of rollers and both driven members. As a vehicle negotiates a curve, it is a well-known fact that the outside rear wheel must travel a greater distance than the inside wheel. Under these circumstances, the outer axle must turn a greater number of revolutions than the inner axle. The ordinary gear type differential makes a provision for the different movement of one wheel relative to the other, so that the tires do not have to scuff the ground in order to permit the turning motion of the vehicle.

In the present device, with the vehicle moving forwardly, both sets of wedging members would be engaged between the outer race and inner race so that both axles of the vehicle would have forward propelling torque delivered to them. As the vehicle starts into a turn, the outside axle must turn forwardly so that the wedging members on that side must come out of engagement between the inner race and outer race to permit the forward excessive rotation of the outside wheel. In the present unit this is accomplished in a manner which prevents any reverse locking of the wedging members on the faster turning axle.

Referring to FIGURES 4 and 5, it may be noted that the left-hand cage 72 is provided on its periphery with an extension 88 and the right-hand cage 73 is provided with an extension 89 of slightly greater circumferential extent than the extension 88. A C-spring 75 is mounted between the cages and extends around them. The end surfaces 90 and 91 of the C-spring are engaging the outwardly extending boss or tab 89 on the right-hand cage 73. The installation of the C-spring causes the same to be pre-stressed so that as assembled, it has an ability to return the cages to a central position by acting upon the tabs or bosses 88 and 89. The slight difference in width of the two tabs permits a very slight amount of adjustment (lost motion) between the two cages in their central position, should the tolerances between the driven members, the rollers, the cages and the outer members require a slight amount of tolerance between them to cause engagement of all of both sets of rollers in a common direction at the same time. Ordinarily, the C-spring 75 keeps the cages moving together and yet permits them resiliently and yieldably to move circumferentially relative one to the other.

Referring to FIGURE 16, a single roller 71 is shown between the outer driving member 50 and the inner driven member 64. The roller is diagrammatically shown between the cam surfaces of the driving member and the cylindrical race of the driven member 64. At the point marked A, the roller 71 can have initial engagement in a forward direction to cause the driven member to rotate with the driving members. Between the point marked A' and the point A is the neutral zone in which the roller 71 would not engage in such a fashion as to cause the transmission of torque between the driving and driven members.

The initial engagement point A of the roller with the two races is a point at which the surface of the roller merely contacts the surface of the races. It is known from stroboscopic examination that the rollers are capable of moving deeper into the engagement so that the total range of engagement is from the point A to a point such as that marked B. This range of engagement is caused by the application of a relatively small amount of torque which will cause the rollers to go into engagement at the point A and the application of a maximum torque such as is capable with high performance engines causing the parts to actually expand and contract, respectively, to allow the rollers to advance to an engagement at the point B.

The amount of circumferential motion between the cages must be of an amount to allow the rollers to move out of the engagement zone to just beyond the point A toward the neutral zone. In the event a vehicle is under a sufficient amount of accelerating torque that the rollers have advanced into engagement deeply into the engagement zone and the vehicle is simultaneously negotiating a curve, obviously the outer wheel on the curve must travel ahead of the inner wheel. To permit the outer wheel to advance ahead of the inner, the driving rollers on the outer axle must come out of engagement to permit the driven member such as 64 to move ahead of the driven member such as 63. The circumferential motion between the cages permits this moving ahead of one set of wedging members relative to the other set of wedging members. An important feature of the present invention is that the motion is permitted and automatically adjustable by the use of a spring, such as the C-spring 75, to allow the rollers on the faster axle to go only to the mouth of the zone of engagement and not pass through the neutral zone so that reverse locking could occur.

It may be observed that the C-spring 75 being pre-stressed in initial assembly always tends to move the cages to a central position relative to each other. In the circumstance of negotiating a curve mentioned just above, the C-spring also resiliently permits one cage to move circumferentially relative to the other, but the resilience of the spring is greater than the cage drag provided by the wire spring 76a so that the rollers will only come just out of engagement and not pass through the neutral zone to a reverse lock position. As torque is lessened on the wheel on the outside of the turn, the rollers on the other axle will tend to embed themselves in the engagement zone more deeply because they have more torque being transmitted through that set of rollers. The resilient motion permitted between the cages is still sufficient that the rollers on the faster axle can go to the point A (FIGURE 16) and thus allow the outer axle to turn forwardly, however, the rollers will still be in contact with both races ready to engage for torque transmission. Under these circumstances of negotiating a turn, should the inner slower wheel lose its traction, the rollers of the outer set would be just at the point A of initial contact and would thus immediately and instantaneously be re-engaged so that forward propelling motion would be transferred from the inner slipping wheel to the outer wheel in the turn. In the present unit the extent of the relative movement between the cages is thus always equal to the extent of circumferential movement of the rollers in the loading zone from point A to point B (FIGURE 16). The motion between the cages is, however, less than the extent of the neutral zone from point A' to point A (FIGURE 16), so that there is never any locking of one set of rollers in a reverse direction and a locking of the other set of rollers in a forward direction.

*The cam angles*

When the rollers initially engage to lock between the driving and driven members, it is essential that the rollers have a positive engagement and not tend to skid or pop out back toward the neutral zone. For the purpose of having a minimum stress at the surface of the races between the rollers and the races, a larger cam angle will produce a smaller stress. Very high tensile strength steels are utilized in both races. Whether the rollers pop out or not is a function of the coefficient of friction and the steepness of the angle between the cam surfaces and the rollers. The steeper the angles and the lower the coefficient, the greater is the tendency for the roller to disengage or pop out of its initial engagement. The stress on the surfaces is known as the Hertz stress and is measured in pounds per square inch. It may be noted in FIGURE 16 that the roller 71 does not contact the inner race (radius $Ri$) and the outer cam race across its diameter, but from a line to a line at either end of a cord 92 and the tangent to the race at the ends of the cord would determine the angle of repose of the roller between the two surfaces. The Hertz stress on the surfaces of the cams and the roller are determined as a function of the tangent of the angle, the greater the tangent of the angle, the less the Hertz stress. If the angles become too steep in a heavily loaded position, the rollers will tend to skid or pop out. The steeper the angle and the greater the tangent of the angle, the less will be the Hertz stress on the surfaces. For these reasons, under the extremely high torque applications, it is desirable to have a greater angle between the inner race and outer race, and for the purpose of making a positive engagement of the rollers between the two races, a less steep or shallower angle between the surfaces is desired.

In the present invention a compound cam angle is employed on the outer race 50 in order to satisfy both the conditions of initial positive engagement and lowering the Hertz stress on the surfaces as the rollers penetrate deeper into the loading zone. Thus, it may be noted that the cord 93 on the roller 71 in the deeper position provides a steeper cam angle by the compound cam angles in the outer race 50 provided. The outer race is provided with a surface formed by a radius from a point 94 to the left of a center line 95 extending from the clutch center and bisecting the cam surface in the outer race 50. It may be noted that the angle "$a$" between a radius from the clutch center to the center of the roller 71 and the radius from the point 94 to the point A of initial engagement is considerably less than the angle "$b$" between similar lines at the position of the roller 71 at its deepest point of penetration between the races.

The reverse and forward cam surfaces are mirror images of each other, having the same angular relationship. On the left of the center line 95, the cam radius is from a point 96 to the right of the center line and is as marked on FIGURE 16. The point A' will be the point at which the roller 71 first engages between the cam race and the cylindrical race and the point B' will be the point of greatest penetration of the roller between the two races. By providing the compound cam angles as described, the input cam tangential angle is shallow and increases as the roller moves up the cam from the point A' to the point B'. The shallow angles are important from the standpoint of avoiding skidding on initial engagement and the steeper angle is important from the standpoint of the stress on the surfaces and can be such as not to permit popping out even at the point of greatest penetration of the rollers between the cams.

Clutch chatter

A condition may exist in a vehicle provided with a manual transmission when negotiating a sharp turn, that there may be considerable noise involving a seeming jerking or chugging of the drive line with the clutch pedal of the vehicle depressed or disengaged. The cause of such clutch chatter is the fact that the differential responds to the input torque. When the engine is driving, the differential outer race rotates with the slower inside wheel in a turn. When the gasoline or throttle position is changed so that the wheels are in effect driving the vehicle, the outer race turns with the faster outside wheel in a turn.

The chatter may occur when the input torque and the output reacting torque become approximately equal. This is generally at low speeds with the engine disconnected (manual clutch disengaged) from the transmission system of the automobile. The outer race always responds to the source of the input torque. If the outer race of the differential is to so respond and the input torque to the outer race from the drive line is low and approximately equal to the reactive torque at the wheels, the wedging elements may tend to bounce between engagement in a forward direction and engagement in a rearward direction, causing a clutch chatter or jerking which is audibly and physically present.

It must be remembered that the drive train to the differential includes the torque tube in the vehicle, certain gears in the transmission as well as the mass of the axles, the differential ring gears and the like. This operates as a fly wheel and provides a resonant mass to the oscillating differential. The oscillation of the outer race might occur when the cams abruptly contact one of the axle clutches which causes the cam race to bounce back relatively toward the other axle clutch. Upon such abrupt contact, the tendency for the clutch rollers is to bounce away from the engagement because they are not restrained by the mass of a motor or of a torque converter not present in manual type transmission. For instance, the outer race, after making an abrupt cam contact in the drive direction (cam 74f) and while the vehicle is in the turn, tends to accelerate ahead which moves the clutch into the neutral zone. At this time, the diametrically opposite cam surfaces (74r) come into abrupt contact with the other set of rollers. Since there is no input load to restrain the outer race, it is free to bounce back again, reversing its direction relative to the direction of the slower inner race. Upon entering the neutral zone, the clutch assembly which bounced the outer race initially again abruptly contacts the outer race thus completing the oscillation cycle.

The bouncing back and forth of the outer race between the slow (inside wheel) and the fast (outside wheel) clutch will continue so long as the input and output torques remain substantially equal and the vehicle continues in the turn. This condition should not be permitted since it is annoying to the owner of the automobile although causes no damage to the parts of the drive train.

In the present invention the oscillation under this selective condition is prevented by damping the movements of the outer race against the inner race. Clutch facing discs such as 77 and 78 in FIGURE 2 are caused to engage with the end of the inner member 63 and the end cap 55 to dampen the movement of oscillation just described. Referring to FIGURE 7, the steel disc 82 is provided with a spline 97 which will engage with the splined end of the axle entering the differential. The clutch disc 80 is provided with a normal type of friction facing 98 as is used in automatic transmission clutch rings and the disc 80 is held against rotation by ears 99 which may engage in the lubrication openings such as 62 shown in FIGURE 2 in the end caps. Thus, the clutch friction faced discs 80 are required to turn with the cap and the steel disc 82 is required to turn with the axle. The friction between the inner member and the cap is chosen to be sufficient to dampen the oscillation of the outer race under the special circumstances mentioned. The greater number of discs that can be utilized will require less spring pressure from the spring washers 83 and the lower spring pressure means a lower pressure on the frictional surfaces and less chance of glazing the clutch material. No particular mounting of friction material on the parts is required since friction disc 80 may be easily keyed in the end caps by the use of the oil holes and the spline on the metal discs 82 between the friction discs permits an easy way of fastening them to the axle itself.

The center bushing

The center bearing 69 between the inner races 63 and 64 has sleeve bearing clearance with the inner races so that lubrication can be conducted to these surfaces. The purpose of the inner bushing is to keep the two races 63 and 64 concentric. The concentric relationship of the driven members enhances the free wheeling of one axle relative to another as when a car goes around a corner. The axles in the modern day automobiles are not entirely full floating as in most trucks, but are of the semi-floating type. In this relationship, there is some load imposed on the differential due to the beam of the axle extending from the differential out to the wheel.

The loads on a vehicle axle may tend to skew the inner races 63 and 64 and such skewing might cause the wedging members or rollers to engage when such engagement is not desired. The skewing of the inner members is prevented by the provision of substantially zero clearance endwise between the driven members and the end caps on the differential housing. The inner members (63 and 64) have their interface 64' in engagement and the friction discs 80 and 82 and disc 81 are all assembled endwise with zero clearance, permitted by the slight compressibility of the friction material 98. The closeness of the center bearing with the inner races is not entirely sufficient to prevent the skewing and primarily maintains the concentricity specified.

General operation

From the foregoing, it may be obvious that the one-way clutches provided for each axle in the present differential are caused to operate together in such a manner that under no conditions can one wheel of a vehicle spin with relation to the other. The wheel that has the traction on the road will get the torque from the engine. The operation of the differential is such that the cage controlling the set of rollers tends resiliently to follow the driven member to which it is resiliently engaged. The circumferential motion between the cages is such that under any condition of engagement of both sets of rollers between the cam surface and cylindrical surface, one set can be released to an extent and only to an extent to permit one shaft to move ahead of the other. There can be no reverse locking, that is, one set of rollers being in engagement in a forward direction and the opposite set engaged in a reverse direction since the motion between the cages is limited to an amount less than the circumferential extent of the neutral zone. In order to accomplish this, the resilient means tending to center the two cages is excessively strong in comparison with the resilient means tending to rotate a cage with a driven member. In addition, a slight amount of adjustment between the two cages to take up for differences in tolerances between the parts is permitted by the specific structure shown in FIGURE 4, the difference in width of the tabs 88 and 89. By the compound cam angles employed in the outer race and initial positive engagement of the rollers between the cams and cylindrical surfaces is insured, and the Hertz stress on the surfaces is reduced as the rollers penetrate deeper between the two races. In addition to the foregoing, the provision of the central bushing between the inner races insures that the races remain concentric enhancing the ability of one wheel to free wheel ahead of another in an automotive vehicle. The friction discs provided between the inner driven members and the end caps on the differential resistively dampen the motion so that under certain conditions noises and vehicle jerking which are objectionable are eliminated and the respective clutches are not permitted to bounce one into forward lock and the other into rearward lock positions.

The basic elements of the differential may have other physical shapes dictated by the axles and differential housings within which the unit is to be used. The torque transmission requirements may also vary permitting size differences in parts. Less difficulty would be encountered if the differential could be built much larger, but the space limitations placed on the unit by the automotive companies makes difficult the obtaining of sufficiently reliable torque transmission in sufficiently high quantity and operational stability under all conditions.

Referring to FIGURE 10, a differently shaped unit is shown. In this unit, the end caps 100 and 101 have a bearing surface 102 on the left and a bearing surface 103 on the right for matching a different differential housing. A ring gear 104 is mounted upon a flange 105 by machine screws 106, the flange being a part of the outer race or driving member 107. The end caps are secured to the driving member as by machine screws 108.

The inner driven members are slightly different in shape from that shown in FIGURE 2. The inner member 109 on the left-hand side is provided with a longitudinal extension 110 in engagement with a sleeve bearing 111. The right-hand driven member 112 is provided with a relatively long extension 113 in engagement with the sleeve bearing 114 in the end cap 101. These sleeve bearings and zero axial clearance between the driven members prevent the inner races or driven members from skewing due to axle loads imposed upon them. The interior surfaces of the driven members are splined in the usual fashion for receiving the axles.

The inner bearing between the two driven members is provided by bearing extensions in the area 115 where the two members are overlapped to provide bearing support, one on the other.

The differential involves two sets of rollers 116 and 117, in this instance being sixteen in each set. The cage for each set of rollers is, however, an aluminum member 118 for the left-hand set of rollers and 119 for the right-hand set which resiliently is gripped to the driven member either by the structure of FIGURE 2 or as is illustrated, by a cage designed sufficiently tight on the driven member to engage it. This may be accomplished by having the cage split at one point in its 360° of body, and having it resiliently grip the outer surface of the inner race. Such structure is not preferred due to the fact that any subsequent break in the cage structure reduces the cage drag to zero.

In the illustration of FIGURE 10, resistive damping of the outer race to the inner races is provided by a single layer friction disc 120 bonded to the left cap and a single disc 121 bonded to the right cap. Only one disc may be used, if desired. The pressure urging the inner members against the end caps of the unit is provided by a single spring washer 122 operating against a spacer 123 engaging the righthand driven member 112, the spring engaging the driven member 109 on the left.

Outside of the difference in size and shape of the parts, the differential of FIGURE 10 would have the operational characteristics set forth above and may be made to incorporate the specific structure illustrated in FIGURES 2 and 3.

Referring to FIGURES 13 and 14, a further modification in the size and structural nature of some parts of a differential housing are illustrated. In this structure the left-hand end cap 130 is provided with the flange 131 and the bolt openings 132 therein as an integral piece to which the ring gear would be attached. The end cap is provided with a bearing surface 134 for reception within the housing of the differential of another American made automobile. The right-hand end cap 135 is also provided with a bearing surface 136 for reception within the differential housing. The outer drive member is a ring-shaped high tensile steel member 137 secured to the end caps by machine bolts 138 and 139, respectively. The outer member 137 has the cam races substantially as shown in FIGURE 16.

The inner races are substantially identical. The driven member 140 on the left is provided with a surface 141 which has bearing relation to the end cap 130 providing support for beam loads delivered to it by the axle. The inner surface 142 of the member is splined to receive the axle. The right-hand driven member 143 is similarly provided with a portion 144 in bearing relation to the cap 135. It also is provided with a spline 145 on its inner surface to receive the right-hand axle. A central bearing 146 is provided between the two inner members within an offset, making room for a pair of spring washers 147 and 148 urging the inner members apart and against the friction disc assemblies 149 and 150, respectively. These assemblies may be a single floating member like FIGURES 8 and 9 without the ears 99.

A set of rollers is provided between each of the driven members and the driving member. The left-hand set of rollers 150 is provided with a cage 151 of slightly different construction that the cage shown in FIGURE 4. A similar cage is provided for the right-hand set of rollers 152, the cage being identified by the reference 153. Referring to FIGURES 11 to 15, the form of the cage is shown to include a steel outer housing 154 in which the openings such as 155 are provided for the reception of the individual rollers of the set. At 90° positions there are shown spring fingers 156 extending inwardly so as to be flexed toward the body 154 of the cage upon endwise assembly of the cage over the inner driven members such as 140 and 143. These spring fingers provide the frictional engagement between the cage and the driven members to provide the drag of the cage on the driven member and thus the control over the rollers of each set.

The centering of one cage relative to another is also accomplished in a slightly different fashion. Referring particularly to FIGURES 11, 14 and 15, a coil compression spring 157 is shown as caught between the left-hand cage 151 and the right-hand cage 153 in a pocket particularly made to receive it. In FIGURE 11 the pocket 158 is provided with opposite seats 159 and 160 for the reception of individual end coils of the spring 157. As the cages move circumferentially relative to each other, the coils of the spring 157 are compressed as shown in FIGURE 15. The spring tends to return the two cages to their centralized position but does permit the lost motion between the cages for the operation of allowing one set of rollers to disengage, allowing its wheel to rotate ahead of the other wheel such as in negotiating a turn. The lost motion between the cages provided by the coil compression spring 157 is of the same nature and the extent as the force of the spring is sufficiently great to overcome the drag of the cages on the inner drive members.

Each of the differentials described have the desired operational characteristics specified. In FIGURE 16, legends have been applied to the parts to aid in understanding the form and relative positions of the wedging members and the races with which they cooperate.

The foregoing detailed description has been given for clearness of understanding only, and no unnecessary limitations should be understood therefrom as some modifications will be obvious to those skilled in the art.

We claim:

1. In a differential having a pair of coaxial driven members, a driving member coaxial with said driven members, two series of wedging elements, each series being adapted to be wedged between said driving and one driven member to effect a driving connection to transmit torque in either direction, the improvement comprising:

separate cage means for retaining the elements of each series in a definite spaced relation;

resilient means engaging each respective cage means and its driven member tending to rotate the cage means with its driven member;

resilient connecting means between said cage means permitting circumferential motion between said cage means and urging the same to a central position relative to each other within the range of said lost motion;

said wedging elements having a range of movement in engagement between said driving and driven members, said connecting means between said cage means automatically limiting circumferential motion between said cage means to the amount of said range of movement when said wedging elements are so engaged;

and frictional damping means connecting said driving and driven members preventing free oscillation of said wedging elements between a driving connection in one direction and a driving connection in the opposite direction.

2. A differential as specified in claim 1 wherein said driven members are side by side and provided with a common bearing between them maintaining said members concentric with each other.

3. In a differential for transmitting power from a shaft to a pair of axially aligned driven shafts having a driving member, two sets of wedging means, each set being interposed betwen the driving member and one of the driven shafts to effect a driving connection to transmit a torque in either direction, and separate cage means retaining each set of wedging means in a definite spaced relation, the improvement comprising: a resilient connection between said cage means providing circumferential motion between the cage means, and cooperating means between said cages for resiliently urging both said cage means toward a central position within said circumferential movement.

4. A differential as specified in claim 3 wherein said resilient connection between said cage means comprises a C-shaped spring extending around the cages with its ends spaced apart and alternately engaging portions of cage means as said cage means move circumferentially relative to each other in either direction.

5. A differential as specified in claim 3 wherein said resilient connection between said cage means comprises a coil compression spring interposed in the cage means with its end coils in contact with each cage in said central position and alternately contacting one cage means as the cage means move relatively circumferentially to each other.

6. A differential as specified in claim 3 wherein the driven shafts are side by side and have a common bearing between them maintaining said shafts concentric one with the other.

7. In a differential for transmitting power from a shaft to a pair of axially aligned driven shafts having a driving member, two sets of wedging means, each set being interposed between the driving member and one of the driven shafts to effect a driving connection to transmit torque in either direction, and separate cage means retaining each set of wedging means in a definite spaced relation, the improvement comprising: said wedging means having a range of movement in engagement between said driving member and driven shafts, and means resiliently connecting said cage means for relative circumferential motion movement in an amount in excess of said range of movement in engagement of the wedging means between the driving member and the driven shafts.

8. A differential as specified in claim 7 wherein said resilient cage connecting means comprises a C-shaped spring about the cage means with portions of each cage means positioned between the ends of the spring, said spring being pre-stressed in assembly engagement with the cage means and relative circumferential movement of said cage means adding stress to said spring.

9. In a differential for transmitting power from a shaft to a pair of axially aligned driven members having a driving member, two sets of wedging means, each set being positioned between the driving member and one of the driven members to effect a driving connection to transmit a torque in either direction and separate cage means retaining each set of wedging means in a definite spaced relation, the improvement comprising: resilient means engaging each respective cage means and its related driven member yieldably urging the cage means to rotate with its respective driven member, and means resiliently connecting said cage means for relative circumferential motion and for urging said cage means to a central relative position, said resilient means connecting said cage means applying a force to said cage means in excess the force yieldably urging each said cage means to rotate with its respective driven member.

10. A differential as specified in claim 9 wherein the driven members are provided with a common bearing between them maintaining the members in concentric relation.

11. A differential as specified in claim 10 wherein said bearing is a separate member within the driven members with a single outer diameter surface in bearing relation with each driven member.

12. In a differential having a pair of coaxial driven members, a driving member coaxial with said driven members, two series of wedging elements, each series being adapted to be wedged between said driving and one driven member to effect a driving connection to transmit torque in either direction and separate cage means for retaining the elements of each series in a definite spaced relation, the improvement comprising:
   resilient means engaging each respective cage means and its driven member providing drag forces tending to rotate the cage means with its driven member,
   a resilient connection between said cage means providing circumferential motion between the cage means, said resilient connection urging said respective cage means to a relative central position within said motion,
   said wedging elements having a range of movement in engagement between said driving and driven members and said resilient connection between said cages being arranged to apply forces to said cages in excess of said drag forces thereby limiting said relative circumferential motion to an amount not exceeding said range of movement when one of said series of wedging elements is engaged between the driving and driven member.

13. In a differential having a pair of coaxial driven members, a driving member coaxial with said driven members, two series of wedging elements, each series being adapted to be wedged between said driving and one driven member to effect a driving connection to transmit torque in either direction and separate cage means for retaining the elements of each series in a definite spaced relation, the improvement comprising:
   one of said driving and driven members having a circular cylindrical surface with said wedging elements in contact with such surface,
   the other of said driving and driven members having a cam surface opposite each wedging element extending toward and away from said cylindrical surface, said cam surface being formed of two intersecting and merging cylindrical cam surfaces, said cylindrical surface having a center radius when extended bisecting said cam surfaces at said intersection, said cam surface on either side of said center radius having its center on the opposite side of said center radius providing an increased cam angle as said wedge means moves into increased interference wedging between said driving and driven members.

14. In a differential having a pair of coaxial driven members, two driving members coaxial with said driven members, a series of wedging elements, each series being adapted to be wedged between said driving and one driven member to effect a driving connection to transmit torque in either direction and separate cage means for retaining the elements of each series in a definite spaced relation, the improvement comprising:
   one of said driving and driven members having a circular cylindrical surface with said wedging elements in contact with such surface,
   the other of said driving and driven members having cam surfaces opposite each wedging element extending away from the cylindrical surface to free the wedging element from driving contact with said cylindrical and cam surfaces and further extending toward said cylindrical surface to provide for driving contact of the wedging elements between said surfaces,
   each cam surface being formed of two intersecting cylindrical surfaces having spaced centers and arranged to provide an increasing angle between the tangents to said surfaces at contact of the wedging elements with such surfaces as the wedging elements move in a range of driving contact between the members.

15. In a differential having a pair of coaxial driven members, a driving member coaxial with said driven members, two series of wedging elements, each series being adapted to be wedged between said driving and one driven member to effect a driving connection to transmit torque in either direction and separate cage means for retaining the elements of each series in a definite spaced relation, the improvement comprising:
   means providing a yieldable drag force to rotate the cage means with its respective driven member;
   resilient connecting means between the cage means tending to center said cage means relative to each other with a force greater than said force tending to rotate the cage means with its driven member;
   and frictional damping means connecting said driving and driven members preventing free oscillation of opposite series of said wedging elements between a driving connection in one direction and a driving connection in the opposite direction.

16. A differential as specified in claim 15 wherein the frictional damping means comprises a friction disc held for rotation with the driving member
   in facial contact with the driven member to provide said damping and spring means yieldably urging the driven member and driving member into contact with said frictional disc.

17. A differential as specified in claim 16 wherein a bearing member is in common bearing relation to said driven members and said spring means urges at least one of said driven members axially in relation to the bearing member to obtain said contact with the frictional disc.

18. In a gearless differential having a pair of coaxial driven members, a driving coaxial with said driven members and two series of wedging elements, each series being adapted to be wedged between said driving and one driven member to effect a driving connection to transmit torque in either direction, the improvement comprising:
   means providing interfacial engagement of said coaxial driven members,
   means engaging outer ends of each driven member including frictional material of a compressible nature in tandem with said driven members,
   and means connected to said driving member confining said driven members and frictional material in endwise assembly with substantially zero clearance whereby said driven members are prevented from skewing relative to said coaxial position.

19. In a differential for transmitting power from a shaft to a pair of axially aligned driven shafts, having a driving member,
   two sets of wedging means, each set being interposed between the driving member and one of the driven shafts to effect a driving connection to transmit a torque in either direction,
   and separate cage means retaining each set of wedging means in a definite spaced relation, the improvement comprising:
a resilient connection between said cage means providing circumferential motion between the cage means,
cooperating means between said cages for resiliently urging both said cage means toward a central position within said circumferential motion movement,
and means providing lost motion of one cage means relative to the other in said centered position.

References Cited by the Examiner
UNITED STATES PATENTS

| | | | |
|---|---|---|---|
| 2,509,560 | 5/1950 | Craft | 74—650 |
| 2,966,075 | 12/1960 | Howich | 74—650 |
| 3,124,972 | 3/1964 | Seliger et al. | 74—650 |
| 3,173,309 | 3/1965 | Seliger | 74—650 |

DAVID J. WILLIAMOWSKY, *Primary Examiner.*

J. A. WONG, *Assistant Examiner.*